United States Patent
Lin et al.

(10) Patent No.: US 12,056,490 B2
(45) Date of Patent: Aug. 6, 2024

(54) METHODS AND SYSTEMS FOR HANDLING CONTROL FLOW STRUCTURES IN DATA-PARALLEL ARCHITECTURES

(71) Applicant: HUAWEI TECHNOLOGIES CO., LTD., Shenzhen (CN)

(72) Inventors: Kevin Lin, Toronto (CA); Guansong Zhang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 17/886,795

(22) Filed: Aug. 12, 2022

(65) Prior Publication Data
US 2024/0053986 A1    Feb. 15, 2024

(51) Int. Cl.
G06F 9/30 (2018.01)
G06F 8/41 (2018.01)
G06F 9/38 (2018.01)

(52) U.S. Cl.
CPC .......... *G06F 9/30058* (2013.01); *G06F 8/433* (2013.01); *G06F 8/443* (2013.01); *G06F 8/45* (2013.01); *G06F 9/30065* (2013.01)

(58) Field of Classification Search
CPC ............. G06F 9/30058; G06F 9/30065; G06F 9/3851; G06F 9/3887; G06F 9/325; G06F 8/433; G06F 8/443; G06F 8/45; G06F 8/452
See application file for complete search history.

(56) References Cited

U.S. PATENT DOCUMENTS

| | | | |
|---|---|---|---|
| 2016/0062771 A1* | 3/2016 | Almasi ............ | G06F 8/41 712/22 |
| 2016/0179535 A1* | 6/2016 | Chen ............... | G06F 9/3887 712/234 |
| 2017/0372446 A1* | 12/2017 | Ashar .............. | G06T 1/20 |
| 2021/0019149 A1* | 1/2021 | Chauhan ......... | G06F 9/30145 |
| 2023/0315479 A1* | 10/2023 | Thuerck .......... | G06F 9/3851 712/7 |

OTHER PUBLICATIONS

Hongjune Kim et al., Compiler-directed soft error resilience for lightweight GPU register file protection, Jun. 2020, [Retrieved on Feb. 13, 2024]. Retrieved from the internet: <URL: https://dl.acm.org/doi/pdf/10.1145/3385412.3386033> 16 Pages (989-1004) (Year: 2020).*

* cited by examiner

*Primary Examiner* — Anibal Rivera

(57) ABSTRACT

Methods, systems and apparatus are provided for handling control flow structures in data-parallel architectures. A method includes receiving, by a processing unit (PU), a program for execution. The method further includes applying, by the PU, a branching solution to the program to obtain data on control flow structures of the program. The method further includes determining, by the PU and based at least in part on the obtained data, one or more control flow structures of the program to predicate. The method further includes applying, by the PU, predication to the one or more control flow structures of the program.

11 Claims, 10 Drawing Sheets

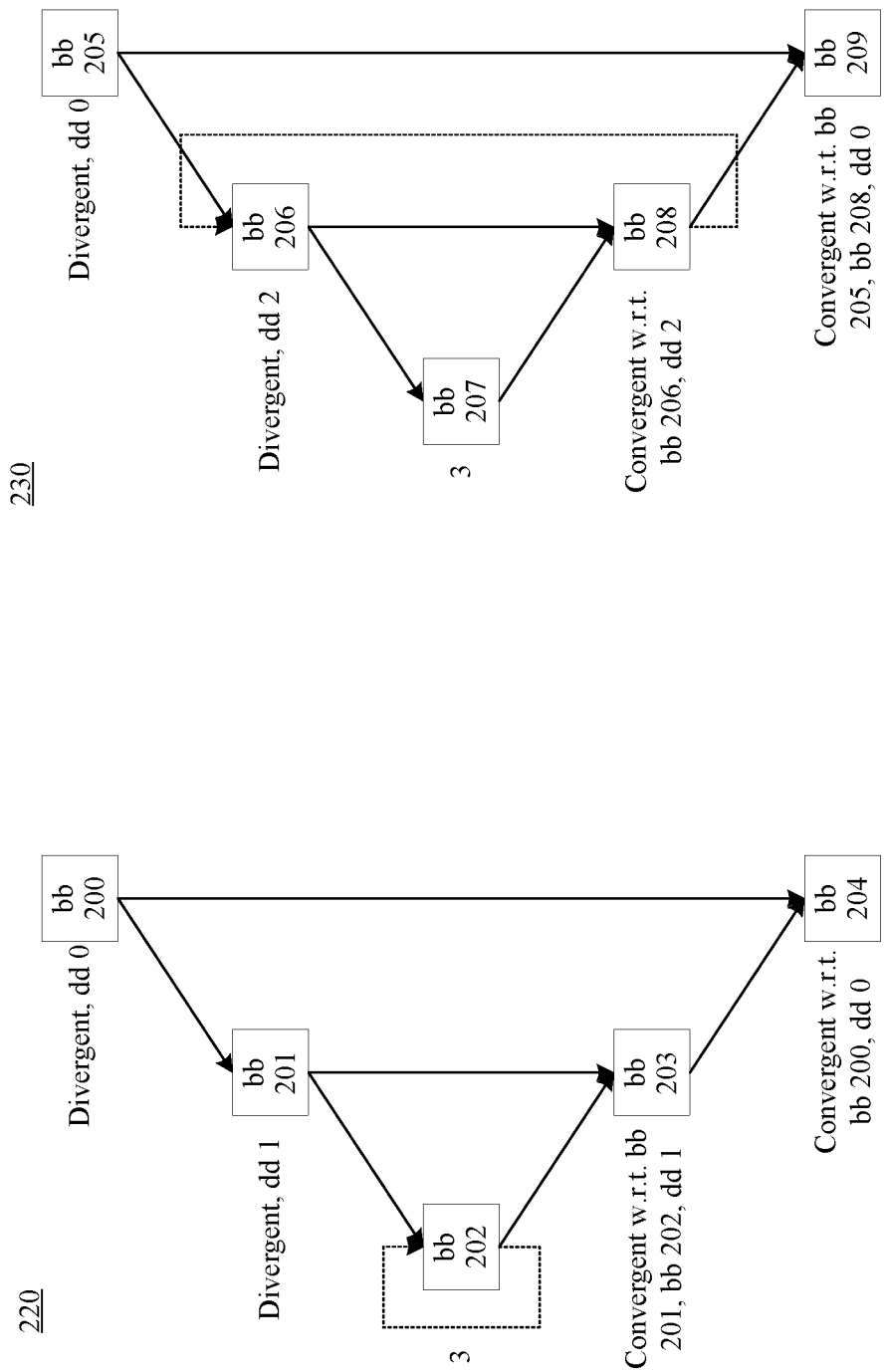

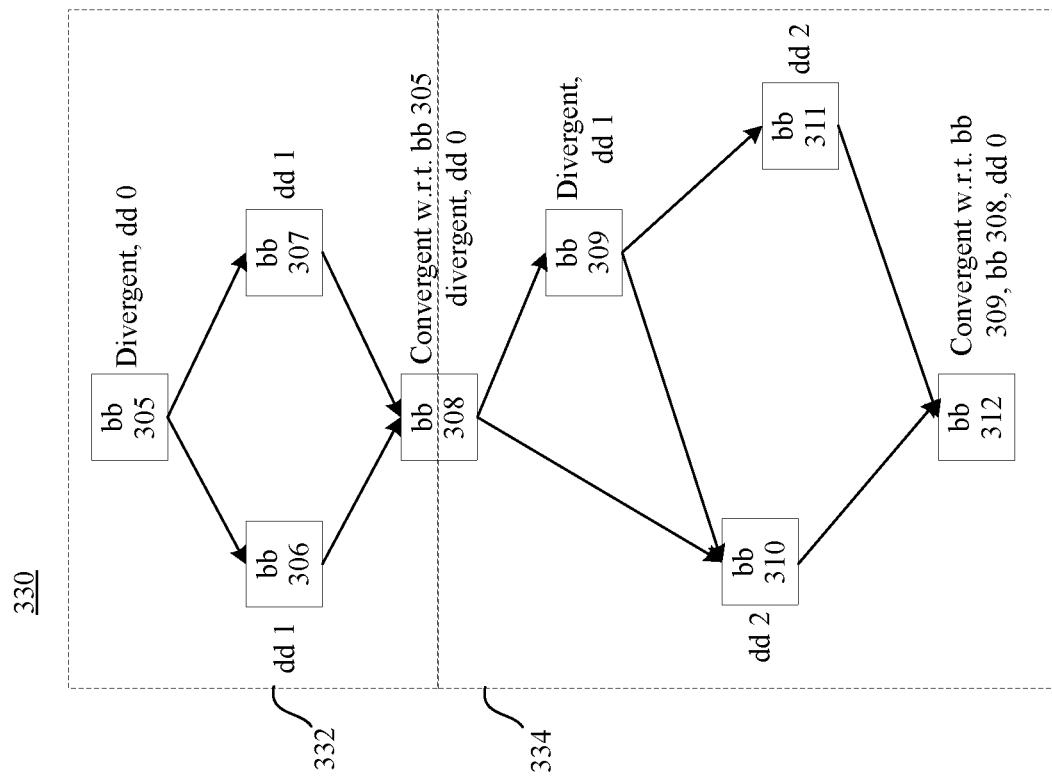
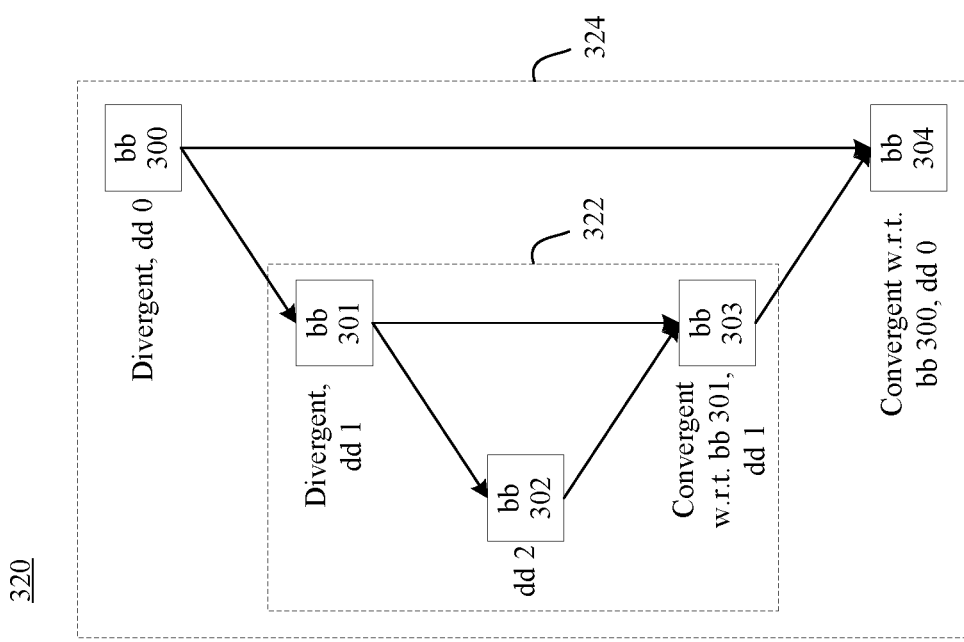
FIG. 3A
FIG. 3B

If_else_endif for structured CFG

If_else_endif for unstructured CFG

METHODS AND SYSTEMS FOR HANDLING CONTROL FLOW STRUCTURES IN DATA-PARALLEL ARCHITECTURES

CROSS-REFERENCE TO RELATED APPLICATIONS

This is the first application filed for the present invention.

FIELD OF THE INVENTION

The present invention pertains to the field of data parallel architectures, and in particular to methods and systems for handling control flow structures in data parallel architectures.

BACKGROUND

In a multithreaded processor, such as a graphics processing unit (GPU), dynamic control flow structures within a program may be handled via predication-only or branching-only approaches. Some of the latest existing techniques for handling control flow seem to focus on predication-only approaches. While predication may be expected to be faster than branching, in some cases, such as complex control flow structures, predication may lead to high overhead or even spillage of the registers. Branching, on the other hand, may have its own limitations due to limited divergent pc ram (DPC) units which are needed for recording and resolving divergencies.

Therefore, there is a need for methods and systems for handling control flow structures in data-parallel architectures that obviate or mitigate one or more limitations of the prior art.

SUMMARY

The present disclosure provides methods, systems and apparatus for handling control flow structures in data-parallel architectures. According to a first aspect, a method is provided. The method includes receiving, by a processing unit (PU), a program for execution. The method further includes applying, by the PU, a branching solution to the program to obtain data on control flow structures of the program. The method further includes determining, by the PU and based at least in part on the obtained data, one or more control flow structures of the program to predicate. The method may further include applying, by the PU, predication to the one or more control flow structures of the program. The method may improve performance by applying a combination of predication and branching to the same program.

Determining, by the PU and based at least in part on the obtained data, one or more control flow structures of the program to predicate may include determining, by the PU, an innermost convergent region of the program with a highest divergent depth. Applying, by the PU, predication to the one or more control flow structures of the program may include applying, by the PU, predication to the innermost convergent region of the program with the highest divergent depth. Applying, by the PU, predication to the innermost convergent region of the program with the highest divergent depth may include applying free predication. The method may further allow for improved performance due to free predication which obviate the need for warp registers.

Determining, by the PU, the innermost convergent region of the program with the highest divergent depth may include determining one of: an if-pattern control flow structure and an if-else-pattern control flow structure.

Determining, by the PU and based at least in part on the obtained data, one or more control flow structures of the program to predicate may further include determining, by the PU, one or more candidate regions of the program in a descending order of highest divergent depth.

Applying, by the PU, predication to the one or more control flow structures of the program may further include applying, by the PU, predication to each candidate region of the one or more candidate regions. The method may further improve performance by selectively applying predication to regions of highest divergent depth.

Determining, by the PU, one or more candidate regions of the program in a descending order of highest divergent depth may include determining, for each candidate region of the one or more candidate regions, that a scalar register pressure associated with the PU is below a threshold pressure of the PU if predication is applied to said each candidate region. The method may improve performance and reduce overhead by ensuring that the warp register do not spill.

Determining, by the PU, one or more candidate regions of the program in a descending order of highest divergent depth may include determining one or more of: an if-pattern control flow structure, an if-else-pattern control flow structure, and a loop-pattern control flow structure. The method may improve performance by selecting regions for predication based on defined patterns.

Determining, by the PU and based at least in part on the obtained data, one or more control flow structures of the program to predicate may include analyzing, by the PU, a scalar register pressure associated with the PU to determine one or more candidate regions of the program to predicate based on a threshold pressure of the PU and the highest divergent depth.

Applying, by the PU, predication to the one or more control flow structures of the program may include applying, by the PU, predication to the determined one or more candidate regions of the program. The method may improve performance by applying predication based on select regions.

Analyzing the scalar register pressure to determine one or more candidate regions may include determining, for each candidate region of the one or more candidate regions, that the scalar register pressure is below the threshold pressure if predication is applied to said candidate region. The method may improve performance and reduce overhead by ensuring that the warp register do not spill.

Analyzing the scalar register pressure to determine one or more candidate regions may further include determining, by the PU, the one or more candidate regions in a descending order of highest divergent depth of the program. The method may further improve performance by selectively applying predication to regions of highest divergent depth.

Analyzing the scalar register pressure to determine one or more candidate regions of the program may further include determining one or more of: an if-pattern control flow structure, an if-else-pattern control flow structure, and a loop-pattern control flow structure. The method may improve performance by selecting regions for predication based on defined patterns.

According to another aspect, an apparatus is provided. The apparatus includes modules configured to perform one or more of the methods described herein.

According to another aspect, another apparatus is provided, where the apparatus includes: a memory, configured to store a program; a processor, configured to execute the program stored in the memory, and when the program stored in the memory is executed, the processor is configured to perform one or more of the methods described herein.

According to another aspect, a computer readable medium is provided, where the computer readable medium stores program code executed by a device, and the program code is used to perform one or more of the methods described herein.

According to another aspect, a chip is provided, where the chip includes a processor and a data interface, and the processor reads, by using the data interface, an instruction stored in a memory, to perform one or more of the methods described herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2A illustrates an example of a divergent CFG, according to an aspect.

FIG. 2B illustrates another example of a divergent CFG, according to an aspect.

FIG. 3A illustrates convergent regions of a structured CFG, according to an aspect.

FIG. 3B illustrates convergent regions of a non-structured CFG, according to an aspect.

It will be noted that throughout the appended drawings, like features are identified by like reference numerals.

DETAILED DESCRIPTION

Figure 1B:
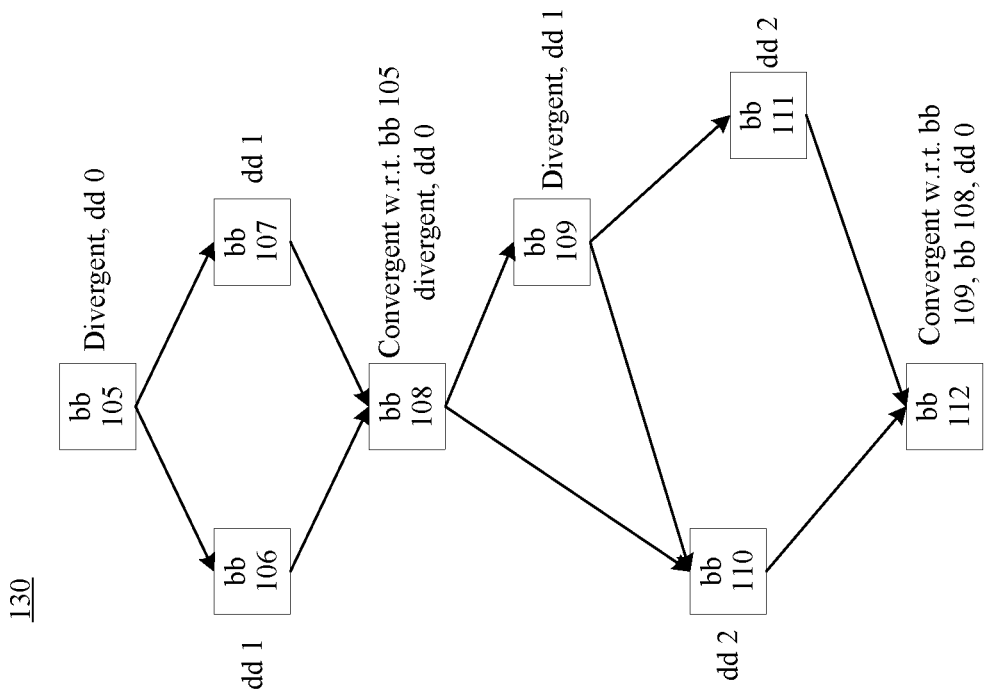
FIG. 1B illustrates a non-structured (or unstructured) CFG, according to an aspect.

In a multithreaded processor, such as a graphic processing unit (GPU), dynamic control flow structures within a program may be handled via two methods, namely, branching and predication. Predication may refer to a software-based solution, e.g., in a compiler, to support divergent code (e.g., if-else statements, loops). When predication is employed, the compiler may need to calculate and manage the active lane-mask for which thread is active at each stage of the divergent code.

Branching may refer to a hardware-based solution to support divergent code. When branching is employed, the compiler may only need to insert BRANCH, MERGE, and EJECT instructions in the appropriate places, and the hardware may dynamically manage the active lane-masks. The branching method may use a hardware branch unit to handle dynamic control flow. The hardware branch unit may use one or more divergent pc arm (DPC) to record and resolve the divergence dynamically. In some aspects, the number of DPC units may be limited. As may be appreciated by a person skilled in the art, the more DPC units that are used in the program, the less concurrent warps may be launched by the hardware.

As may be appreciated by a person skilled in the art, in a data-parallel architecture, multiple threads may run at the same time. Lane-mask may be used to indicate which threads are active during each stage of the program execution.

Some existing techniques for handling control flow structures in data-parallel architectures focus on exploring new design and proposal for new predication-based approaches. However, regardless of the efficiency that may be obtained from such prediction-based solutions, likely, there may be corner cases that a hardware-based solution may be more efficient. For example, in some cases, prediction-based solutions may incur high overhead, in which case, a hardware-based solution may be a better option. Accordingly, aspects of the disclosure may provide for a solution that efficiently combines predication-based and hardware-based solutions for achieving improved performance of the control flow structures. For example, in some aspects, a mix of both software-based and hardware-based solutions may be efficiently used for improved performance. A control flow structure may refer to the execution order of a group of basic blocks that represents a divergent source code. Basic block may refer to a sequence of instructions that is straight-line code sequence with no branches nor jump in the middle. In some aspects, a branch or jump can be the last instruction of a basic block. Divergent source code may refer to a code that diverges or splits a program's path into two or more paths, e.g., if statements, if-else statements, loops, and the like.

As may be appreciated by a person skilled in the art, aspects of the disclosure may apply to hardware architecture that support mixing the two solutions.

The performance of using a hardware (branching) solution versus a software (predication) solution for handling control flow structures have been analyzed. Further, research has been conducted on new predication-based approach for handling control-flow structures in data-parallel architectures.

Some aspects may provide for a systematic approach on determining when to use predication solution for certain control flow blocks within a whole program. Accordingly, some aspects may provide for determining when the use of a predication solution may be beneficial or lead to improved performance.

According to some aspects, performance of the whole program may be improved based on selective application of a predication solution or a branching solution to each control flow block within the whole program. In some aspects, the improved performance may apply to programs on all data-parallel architectures, for example, a GPU.

As described herein, prior art only focuses on designing new predication-only solution for control flow structures. For simple control flow structures, a predication solution may run more efficiently than a hardware one, however, a predication only solution may have high overhead when calculating and managing lane-mask for complex control flow structures. In such high overhead circumstances, use of predication only solution may be inefficient compared to the simpler hardware solution (branching).

Some aspects of the disclosure may relate to mixing branching and predication solutions to improve performance of any control flow structures. In some aspects, control flow structures may be analyzed, and one or more predication solutions may be selectively applied on a series of control flow structures that may offer performance benefits.

In some aspects, a branching solution may be applied initially to control flow structures of the program. Then, in some aspects, according to a method, specific data structures may be determined for applying a predication solution. The determination of specific data structures for applying the predication solution may lead to improved performance on the hardware.

System architectures or scenario to which aspects of the present disclosure may apply to include data-parallel architectures that support mixing of branching and predication solutions to the same program.

As may be appreciated by a person skilled in art, current market GPUs either permit choosing branching-only or predication-only approaches to support control flow structures of a program. An aspect of the disclosure may provide for an alternative that support mixing the two solutions (e.g., branching and predication) at the same time for the same program.

A solution that supports both branching and predication approaches may provide improved performance for complex programs over either one of the two solutions (branching and predication approaches). With the potential benefits associated with applying both solutions to the same programs, in future, GPUs (or other data-parallel architecture hardware) are likely to support the mixing of branching and predication for the same program.

According to an aspect, an assembly generated by a compiler of a data-parallel architecture harder, such as the GPU may be as follows. In some aspects, the innermost convergent regions, having an if-pattern (e.g., If_endif pattern) control flow structure or an if-else pattern (e.g., if_else_endif pattern) control flow structure may be predicated with save_P0 or restore_P0 like special registers. Further, one or more candidate regions that have a WGPR pressure within a threshold and have defined pattern may be predicated. For example, the one or more candidate region may have a pattern similar to one of: an if-pattern control flow structure, an if-else pattern control flow structure, or a loop-pattern control flow structure. In some aspects, the remaining control flow blocks may be implemented with a branching solution.

In some aspects, the predication method may be faster than the branching method. The predication method is a software solution where the compiler may manage the predicate mask explicitly to handle the dynamic control flow. In some aspects, predication may need to use scalar registers to store lanemask (active threads) before predication and restore lanemask after predication. As may be appreciated by a person skilled in the art, inappropriate use of the predication method may cause scalar register to spill.

Existing hardware may not support having predication and branching for the same program. Some aspects may provide for determining a combination of predication and branching to use for a program based on the control flow structures of the program which may lead to improved performance.

In the context of parallel programming where multiple threads exists, e.g., in a GPU, predication or branching solutions may be selected to support different control flow structures in a program.

In branching, which is a hardware solution, the hardware may maintain a DPC level. Each divergence stage in a program may correspondingly increase the DPC level. Increased DPC level may lead to increased cost and reduced performance. As may be appreciated by a person skilled in the art, the number of parallel threads may depend on the DPC level, and thus, the higher DPC level, the less parallelism that may exist in the GPU. Thus, minimizing the DPC level may be desirable to allow for increased parallelism and performance in data-parallel architectures.

Predication is a software solution, where the software (a compiler) may track the current active threads that are executing the current block(s) of code and further track the remaining active threads. The compiler may rely on a limited number of registers, called the WGPR, the warp register or the scalar register, to perform its functions. Accordingly, maximizing the use of the limited registers, before any spillage, is desirable for achieving improved performance.

In some aspects, use of the limited registers may be maximized by uniquely selecting one or more control flow structures for applying predication. For example, selection of the control flow structures may be based on one or more of: their commonality among the different programs; their cost, e.g., the number of registers which may be required for applying predication; and other relevant considerations for achieving improved performances. In some aspects, the control flow structures that may meet such requirement of improved performance may include one or more of: if-pattern, if-else-pattern, loop pattern, and other control flow structures that may be determined to fit the criteria.

In some aspects, combining predication with branching may allow for improved performance. By maximizing the use of scalar registers in applying predication, the lower the DPC level which may be obtained when applying branching.

According to an aspect, a method is provided. The method may include analyzing the control flow structures of a program. In some aspects, analyzing the control flow structures of the program may include applying branching solutions to control flow structures in the program. In some aspects, by applying branching solutions to the control flow structures in the program, relevant data related to the program may be determined. In some aspects, the relevant data may include divergent depth of the control flow structures, which may further indicate the critical path.

The method may further include estimating scalar register pressure to ensure proper use. In some aspects, estimating scalar pressure to ensure proper use may further include ensuring that use of predication on such control flow block will not cause the scalar registers to spill. In some aspects, the method may further include determining or finding the critical path of control flows. In some aspects, the method may further include selectively using branching and predication to optimize the performance of control flow structures within the whole program.

In some aspects, before applying the branching or predication solutions, some generic analyses may need to be performed to determine which blocks (e.g., control flow structures) of a program would be beneficial to apply predication instructions. Some of the generic analyses may include one or more of: divergent depth analysis, convergent regions determination, and innermost convergent regions determination. In some aspects, while performing these analyses, branching solution may be applied to all regions of the program initially. In some aspects, applying branching solution to all regions of the program may include adding branching instructions to all regions of a program initially. In some aspects, the addition of the branching instructions to all regions of a program may be done quickly and efficiently.

Using the results of these analyses, one or more control flow structures may be determined for applying predications. In some aspects, after determining the one or more control flow structures to predicate, the predication solution may be applied to the determined one or more control flow structures. In some aspects, applying predication solution to the determined one or more control flow structures may include adding predication instructions to the regions associated with the determined one or more control flow structures. In some aspects, adding predication instructions to the to the regions associated with the determined one or more control flow structures may include replacing or changing the branching instructions (that were initially added) of the regions associated with the determined one or more control flow structure with predication instructions.

Accordingly, in some aspects, branching and predication may be applied to select regions of the same program. Branching may be applied to a first region of the program and predication may be applied to a second region of the program. In some aspects, the second region of the program may include one or more regions associated with one or more control flow structures determined to be beneficial for applying predication as described herein. In some aspects, the first region of the program may include all regions of the program other than the second region.

In some aspects, a block may be divergent if it has more than one successor. In some aspects, a block may be convergent with respect to a divergent block if the block (convergent block) immediately post-dominate the divergent block.

Given any basic block from a control flow graph, on any path from an entry block (included) to the basic block (excluded), wherein each block is visited once, the maximum number of divergent block(s) visited may be defined as the divergent depth of this basic block. The terms 'included' and 'excluded' as used here may refer to the inclusion or exclusion, respectively, of the one or more exit paths of a block for determining a divergent depth of a block of interest, e.g., a basic block. The term 'included' means the one or more exit paths of a block are considered for calculating the divergent depth of a basic block. Whereas, the term 'excluded' means the one or more exit paths of a block are not considered for calculating the divergent depth of a basic block. For example, to determine the divergent depth of a basic block at some place in a control flow structure of a program, the divergent depth calculation may begin at an entry block. The one or more exit paths of the entry block may be considered for calculating the divergent depth of the basic block. For example, if the entry block's exit path diverges, e.g., multiple exit paths, then the divergent depth may increase by 1, whereas if the entry block's exit path does not diverge, e.g., one exit path, the divergent depth stays the same. The same approach may be taken for the one or more blocks between the entry block and the basic block. At the basic block, the one or more exit paths may not be considered for calculating the divergent depth of the basic block, since any divergence at the basic block may result in a higher divergent depth than the correct value. Further examples of divergent control flow graph are described herein.

Figure 1A:
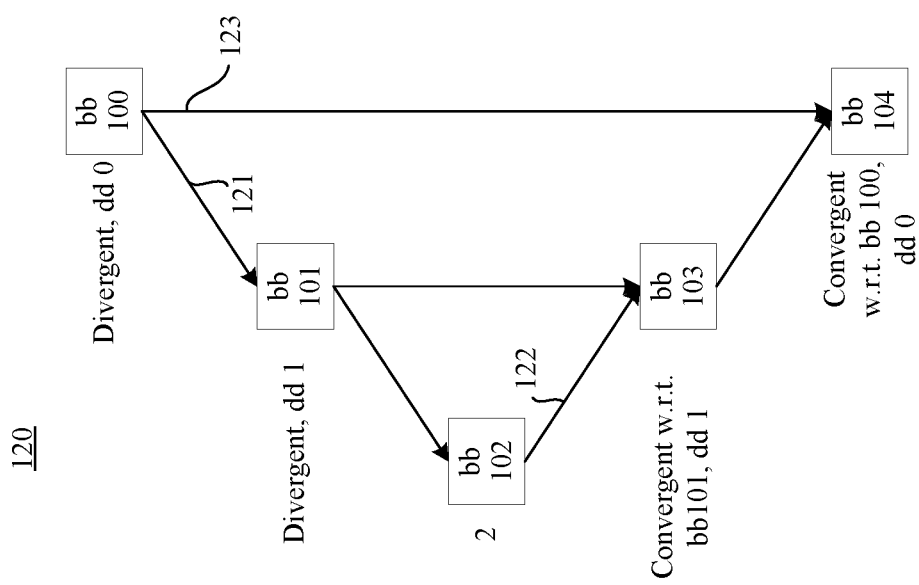
FIG. 1A illustrates a structured control flow graph (CFG), according to an aspect.

FIG. 1A illustrates a structured control flow graph (CFG), according to an aspect. The CFG 120 may be viewed as one representation of a divergent flow. In the CFG 120, the left path 121 may lead to a divergent block, base block (bb) 101, and the right path 122 may lead to its convergent block bb 103. In an aspect, bb 100 may represent an if-pattern control flow structure, e.g., an if statement indicating a condition, such that if the condition is found true or valid, path 121 may result, and if the condition is false or invalid, path 123 may result. Such if-pattern control flow structure may increase the divergent depth at bb 101 and correspondingly increase the DPC level by 1. Similarly, bb 101 may represent a second level of divergency, e.g., another if-pattern control flow structure.

In an aspect, the path initially, or at initial block 100, may have a divergent depth of 0. In the figures, divergent depth is indicated via 'dd'. The path leading to a divergent block may increase its divergent depth e.g., at bb 101 and bb 102. Similarly, the path leading to a convergent block may decrease its divergent depth e.g., at bb 103 and 104. Accordingly, the divergent depth at bb 101 may be 1, the divergent depth at bb 102 may be 2, the divergent depth at bb 103 may be 1, and divergent depth at block 104 may be 0. As illustrated, the convergent block bb 103 may be convergent with respect to divergent bb 101, and similarly, block 104 may be convergent with respect to divergent bb 100.

In CFG 120, bb 102 has the highest or maximum divergent depth among the blocks. The divergent depth at bb 102 is 2, which may correspond to two levels of DPC. In an aspect, the level of DPC associated with CFG 120 may be reduced by applying predication to a select control flow structure. In as aspect, the innermost control flow structure, comprising bb 101, bb 102 and bb 103, may be selected for applying predication. The innermost control flow structure may cost the least among the control flow structures, in terms of required registers for predication. By applying predication to bb 101, bb 102 and bb 103, one level of divergence may be handled, thereby reducing the DPC level by 1, which may not have been the case if only branching was applied.

FIG. 1B illustrates a non-structured (or unstructured) CFG, according to an aspect. The non-structured CFG 130 may be viewed as another representation of a divergent flow. In a non-structured CFG 130, a block's successors may or may not be a convergent block. In an aspect, bb 105 may represent an if-else-pattern control flow structure, such that bb 106 may represent the successor block for 'if' portion of the if-else-pattern, and bb 107 may represent the successor block for the 'else' portion of the if-else-pattern. In an aspect, the successor blocks bb 106 and 107 may merge at bb 108, as illustrated.

In some aspects, if a blocks' successor is not a convergent block, the successor blocks' divergent depth may be incremented by 1. For example, bb 106 and bb 107 are successors blocks to bb 105 and are not convergent blocks. The divergent depth at bb 106 and 107 are both 1, an increment of 1 from the divergent depth at bb 105. In some aspects, if a successor block is a convergent block, then its divergent depth may be the same as the entry block it converges. For example, bb 108 is a convergent block that converges the divergency created by bb 105. Thus bb 108 reduces the divergency by the amount bb 105 created, which in this example is 1. Accordingly, the divergent depth of bb 108 is the same as the that of bb 105, which is 0.

In some aspects, a block e.g., bb 108, while convergent with respect to bb 105, may be divergent, having two paths emerging from the block (diverging to blocks bb 109 and bb 110). In the case of bb 108, its divergent depth may be determined from its corresponding divergent block, e.g., bb 105. In some aspects, a block, e.g., bb 110, may be a successor block to a plurality of divergent blocks, e.g., bb 108 and bb 109, and thus the divergent depth of the successor block, bb 110, may be determined based on the higher divergent depth among the plurality of predecessor divergent blocks. In the case of bb 110, its divergent depth may be 2, an increment of 1 from the divergent depth of bb 109 (having a higher divergent depth than bb 108). In some aspects, a block, e.g., bb 112, may be a convergent block with respect to a plurality of divergent blocks, e.g., bb 108 and bb 109. In the case of bb 112, its divergent depth may be determined based on the lower divergent depth among the plurality of predecessor divergent blocks. Thus, the divergent depth of bb 112 may be 0, which is the divergent depth of bb 108 (having a lower divergent depth than bb 109).

FIG. 2A illustrates an example of a divergent CFG, according to an aspect. The CFG 220 may be similar to CFG 120, with the exception of blocks bb 202 and bb 203. In CFG 220, bb 202 is a divergent block as a result of a loop 221. In some aspects, a loop may have a counter operating according to a condition, e.g., a maximum exit count. Such a loop may increase the divergency of an associated block. Thus, bb 202 may have increased divergence depth of 3. Accordingly, bb 203 may be a convergent block with respect to both bb 201 and bb 202 and have a divergent depth of 1, similar to that of bb 201. In the case of bb 204, the block may be convergent with respect to bb 200 and have a divergent depth of 0, similar to that of bb 200.

FIG. 2B illustrates another example of a divergent CFG, according to an aspect. In an aspect, the CFG 230 may comprise a loop 231 diverging from bb 208 and diverging to bb 206 as illustrated. Since bb 206 is a successor block to divergent blocks bb 205 and bb 208, bb 206 may have a divergent depth of 2 as illustrated. Bb 207 is a successor block to divergent bb 206 and thus has a divergent depth of 3. Bb 208 is a convergent block with respect to bb 206 and a successor block to convergent block 207, accordingly, bb 208 has a divergent depth of 2. Bb 209 is a convergent block to both bb 208 and bb 205 and has a divergent depth of 0.

According to some aspects, a convergent region may refer to a path from a convergent block to its corresponding one or more divergent blocks. In some aspects, a convergent region may include all blocks along the path from the convergent block to the corresponding divergent block. FIGS. 3A and 3B further illustrates some examples of convergent regions, according to some aspects.

FIG. 3A illustrates convergent regions of a structured CFG, according to an aspect. In an aspect, CFG 320 may be similar to CFG 120 of FIG. 1A. In an aspect, CFG 320 may comprise convergent regions 332 and 334 as illustrated. Convergent region 332 may comprises divergent block bb 301, bb 302 and convergent block bb 303. Convergent region 334 may comprise divergent block bb 300, convergent block bb 304, and convergent region 332.

FIG. 3B illustrates convergent regions of a non-structured CFG, according to an aspect. In an aspect, CFG 330 may be similar to the CFG 130 of FIG. 1B. In an aspect, CFG 330 may comprise convergent regions 332 and 334. Convergent region 332 may comprise divergent block bb 305, bb 306, bb 307, and convergent block bb 308 (being convergent with respect to bb 305). Convergent region 334 may comprise divergent block bb 308, divergent block bb 309, bb 310, bb 311, and convergent block 312 (being convergent with respect to bb 308 and 309). In some aspect, a convergent region, e.g., 334, may include more than one divergent block e.g., bb 308 and bb 309.

In some aspects, a corresponding divergent block, in a convergent region, may have the same or a higher divergent depth than that of a convergent block in the convergent region. For example, a corresponding divergent block may have a loop which may increase the block's divergent depth and result in a higher divergent depth than the corresponding convergent block in a convergent region.

In some aspect, a convergent region may refer to a path from a convergent block to its corresponding divergent block, with the same divergent depth or higher depth (e.g., if it's a loop region), and one or more blocks within. In some aspects, with respect to a convergent region, only a convergent block may jump outside this region (have a path outside this region), and blocks outside the region may jumps to divergent block only.

In some aspects, for a convergent region, only the convergent block (usually the bottom block in the convergent region) may have a path outside or exiting this region. Similarly, the divergent block (usually the top block) may have a path coming from outside of the region entering the region (via the divergent block). Any intermediate blocks within the convergent region may not have a path entering the region, nor a path exiting the region.

In some aspects, predication may be combined with branching to improve performance. In some aspects, predication may be applied to the innermost convergent region of a program. Accordingly, the innermost convergent region of a program may be determined for applying predication. In some aspect, the predication applied to the innermost region may be based on a free predication.

As may be appreciated by a person skilled in the art, free predication may refer to a form of predication that may obviate the need to use a warp register for saving the predicated mask. Accordingly, free predication may not use a warp register, which may otherwise be needed. Avoiding the use of warp register further improves performance by allowing the warp registers to be used for regions e.g., convergent regions and candidate regions, other than the innermost convergent region.

In some aspects, free predication may operate based on a special instruction that acts like a stack. The stack may be configured to remember the predicated mask thereby obviating the need to use a warp register that stores the active threads. Accordingly, free predication may allow for further improved performance by saving one level of predicated mask (i.e., storing and restoring the predicated lane mask) using a stack-storing-popping mechanism.

Figure 4:
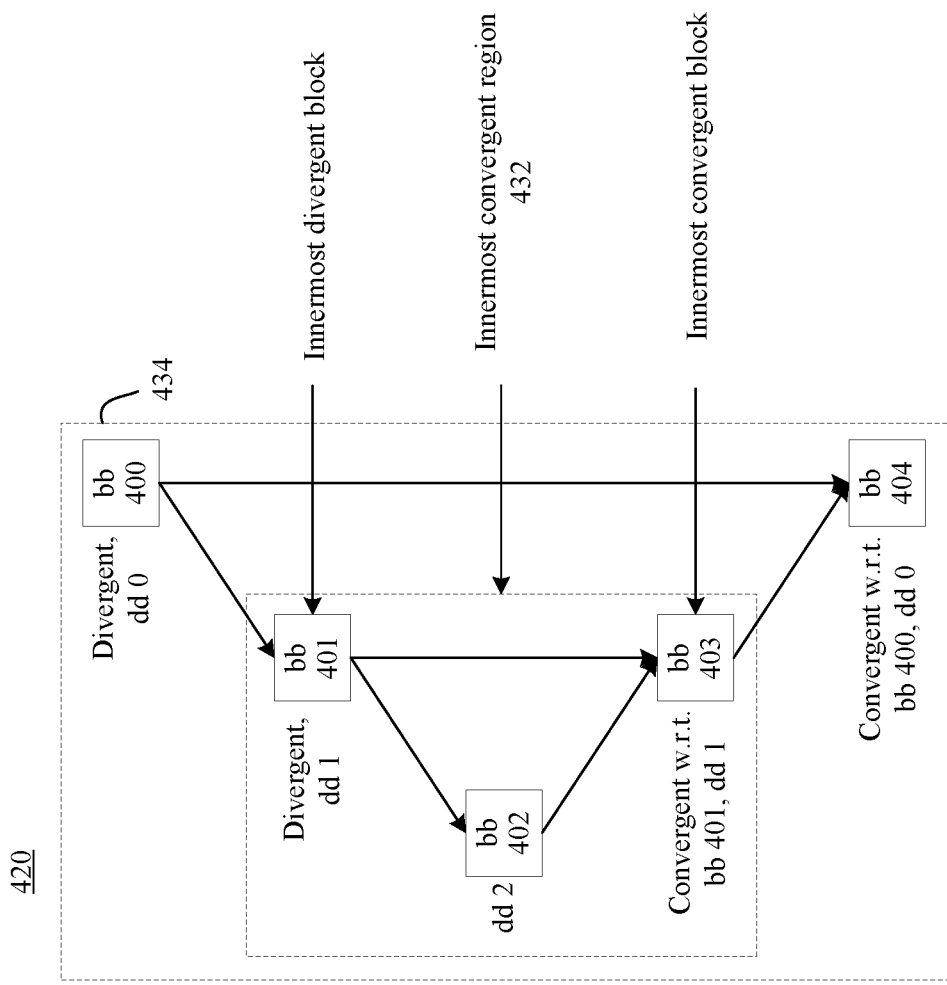
FIG. 4 illustrates an innermost convergent region of a CFG, according to an aspect.

FIG. 4 illustrates an innermost convergent region of a CFG, according to an aspect. In an aspect CFG 420 may be similar to the CFG 330 of FIG. 3A. In an aspect CFG 420 may comprise convergent regions 432 and 434 as illustrated. Convergent region 432 may comprises divergent block bb 401, bb 402 and convergent block bb 403 (being convergent with respect to bb 401). Convergent region 434 may comprise divergent block bb 400, convergent block bb 404, and convergent region 432.

In some aspects, a convergent region, may be innermost if the region has only one convergent block, and this convergent block may be the innermost convergent block. For example, convergent region 432 may be an innermost convergent region of CFG 420 since the region has only one convergent block, e.g., bb 403. Accordingly, convergent block bb 403 may be the innermost convergent block of CFG 420. In some aspect, the divergent block, e.g., bb 401, in the innermost convergent region may be viewed as the innermost divergent block.

In some aspects, a divergent block may be innermost if the block is in the innermost convergent region, with the same divergent depth as or a higher divergent depth than (e.g., if the divergent depth has a loop) the convergent block. In some aspects, the convergent region may have the higher divergent depth in the program.

As described herein, in some aspects, the innermost convergent region of a program may be determined for applying predication according to a free predication approach. After determining the innermost convergent region and applying free predication thereto, in some aspects, one or more candidate regions of the program may be determined for predication. In some aspects, the predication applied to the one or more candidate regions may rely on or use the warp registers In some aspects, the one or more candidate regions of the program may be determined in a descending order of highest divergent depth. In some aspects, each subsequent candidate region of the one or more candidate regions determined may have a divergent depth equal to or less than a divergent depth of a previous candidate region determined. In some aspects, the first candidate region of the one or more candidate regions determined may have a divergent depth equal to or less than the divergent depth (the highest divergent depth) of the innermost convergent region. The second candidate region of the one or more candidate region determine may have a divergent depth equal to or less than the divergent depth of the first candidate region. The number of candidate region determined may be determined based on the threshold pressure. In some aspects, each candidate region of the one or more candidate regions may be determined provided that a scalar register pressure of an associated processing unit is below a threshold pressure if predication is applied to said each candidate region. As described herein, a threshold pressure may refer to the pressure at which the register may spill.

In some aspects, the one or more candidate regions of the program may be determined for predication based on one or more of: the threshold pressure and a highest divergent depth of the program. In some aspects, each candidate region of the one or more candidate regions may be determined provided that the scalar register pressure is below the threshold pressure. In some aspects, the one or more candidate regions may be determined in a descending order of the highest divergent depth of the program.

In some aspects, determining one or more regions (including the innermost convergent region and the one or more candidate regions) to predicate may be based on determining the control flow structure comprising the most nested functions (or the most nested control flow structure).

In some aspects, the one or more candidate regions for predications may be determined based on regions that may maximize performance while maintaining the predication overhead low. In some aspects, the one or more candidate regions may include one or more of: an if-pattern (e.g., If_endif pattern) control flow structure, an if-else-pattern (e.g., if_else_endif pattern) control flow structure, and a loop-pattern control flow structure. Thus, in some aspects, the one or more candidate regions may be determined based on the three types of regions described.

Figure 6:
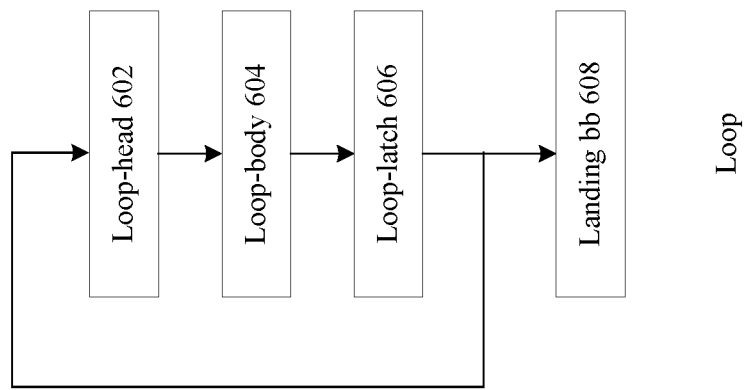
FIG. 6 illustrates a loop-pattern control flow structure, according to an aspect.
Figure 5:
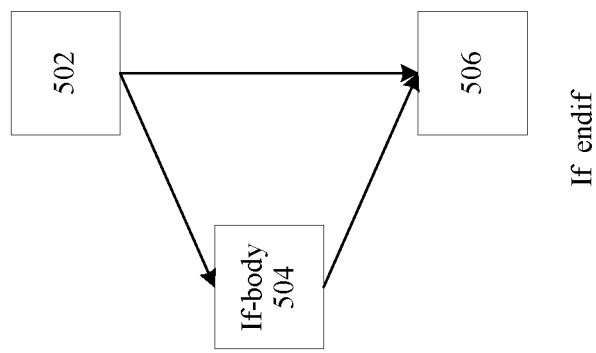
FIG. 5 illustrates an if-pattern control flow structure, according to an aspect.

FIG. 5 illustrates an if-pattern control flow structure, according to an aspect. In some aspects, the if-patten control flow structure 500 may comprise a convergent block 506 converging two paths diverging from a divergent block 502. In some aspects, the two paths diverging from the divergent block 502 may comprise a direct path to the convergent block 506, and an indirect path to the convergent block 506 where the indirect path may pass through a regular block or a convergent region, e.g., an if-body block 504. In some aspects, the divergent depth of the divergent block 502 may be the same as the divergent depth of the convergent block 506. In some aspects, the two paths from FIG. 6 illustrates a loop-pattern control flow structure, according to an aspect. In an aspect, the loop pattern control flow structure 600 may comprise one or more of: a loop-head 602, a loop-body 604, a loop-latch 606, and a landing bb 608. In an aspect, the landing block in the loop-pattern control flow structure 600 may be a convergent bb after execution of the loop. In an aspect, the loop-latch block 606 may be a divergent block. In some aspects, the loop-latch 606 may have a back-edge pointing to the loop header 602. In some aspects, the loop-header or loop-head 602 may be a regular block. In some aspects, the loop-body 604 may be either a regular block or a convergent region.

In some aspects, the loop-head 602 may indicate a set of conditions that if true may permit the program to continue to the loop-body 604. Once the set of conditions are no longer true then the program may continue to the landing bb 608. In some aspects, the loop-latch 606 may determine whether the conditions in loop-head 602 remain true to loop the program back to loop-head 602 or exit the loop to the landing bb 608.

Figure 7B:
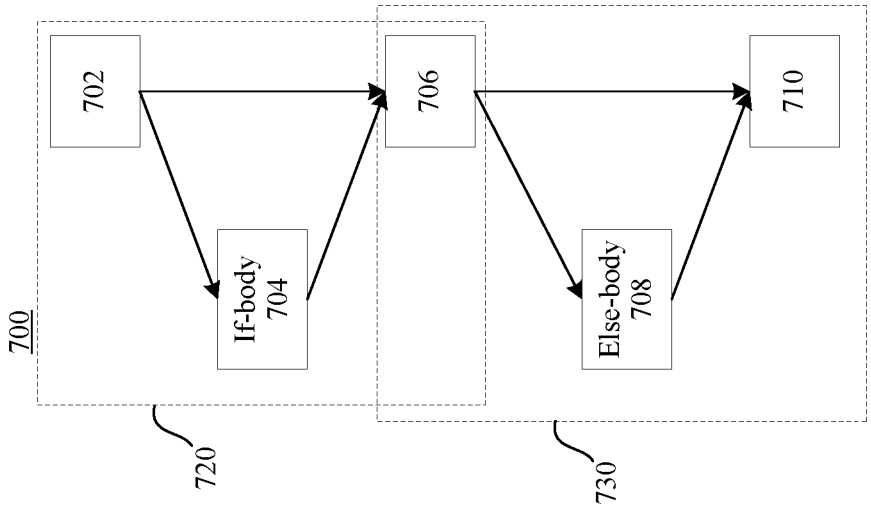
FIG. 7B illustrates an if-else pattern control flow structure for a structured CFG, according to an aspect.
Figure 7A:
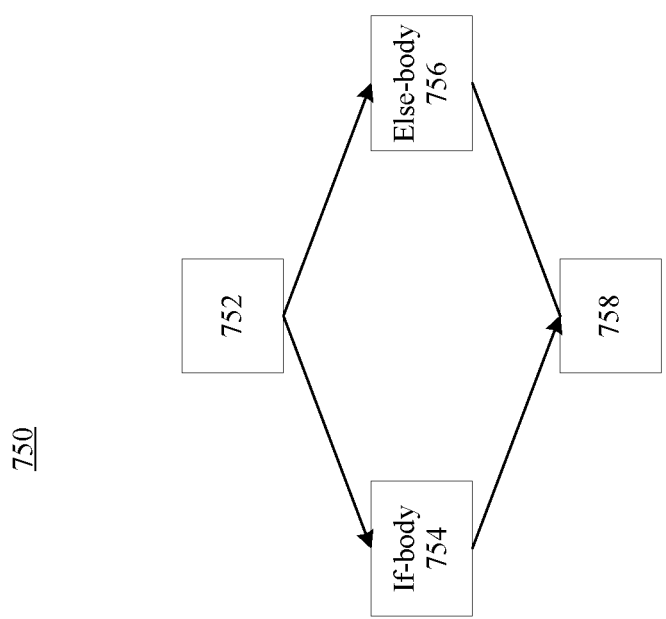
FIG. 7A illustrates an if-else pattern control flow structure for an unstructured CFG, according to an aspect.

FIG. 7A illustrates an if-else pattern control flow structure for an unstructured CFG, according to an aspect. In an aspect, the if-else pattern control flow structure 750 may comprise a convergent block 758 converging two paths diverging from a divergent block 7522. In some aspect, each of the two paths diverging from the divergent block 752 may be an indirect path passing through a regular block or a convergent region. For example, in the if-else pattern control flow structure 750, one path may pass through an if-body block 754 and the other path may pass through an else-body block 756 as illustrated.

FIG. 7B illustrates an if-else pattern control flow structure for a structured CFG, according to an aspect. In some aspects, an if-else pattern control flow structure 700 may comprise one or more divergent blocks 702 and 706, and one or more convergent blocks 706 and 710 as illustrated. In some aspects, the one or more divergent blocks 702 and 706 in a structured CFG may be present or may be executed one after another (or sequentially) as illustrated.

In some aspects the if-else pattern control flow structure for a structured CFG 700 may comprise, sequentially, a first convergent region 720 and a second convergent region 730. In an aspect, the first convergent region 720 may comprise a first divergent block 702 diverging two paths to a first convergent block 706. The two paths diverging from the divergent block 702 may comprise a direct path to the convergent block 706 and an indirect path to the convergent block 706, where the indirect path may pass through a regular block or a convergent region, e.g., an if-body block 504.

In some aspects, the second convergent region 730 may comprise a second divergent block 706 diverging two paths to a second convergent block 710. The two paths diverging from the divergent block 706 may comprise a direct path to the convergent block 710 and an indirect path to the convergent block 710, where the indirect path may pass through a regular block or a convergent region, e.g., an else-body block 708.

Accordingly, in some aspects, in if-else pattern control flow structure for a structured CFG 700, before entering the else-body region e.g., block 708, the control flow structure may initially converge, e.g., at block 706, on an if-body region, e.g., if-body 704. The control flow structure may thereafter converge, e.g., at block 710, on the else-body region, e.g., else-body block 708.

Figures 8A, 8B, 8C:
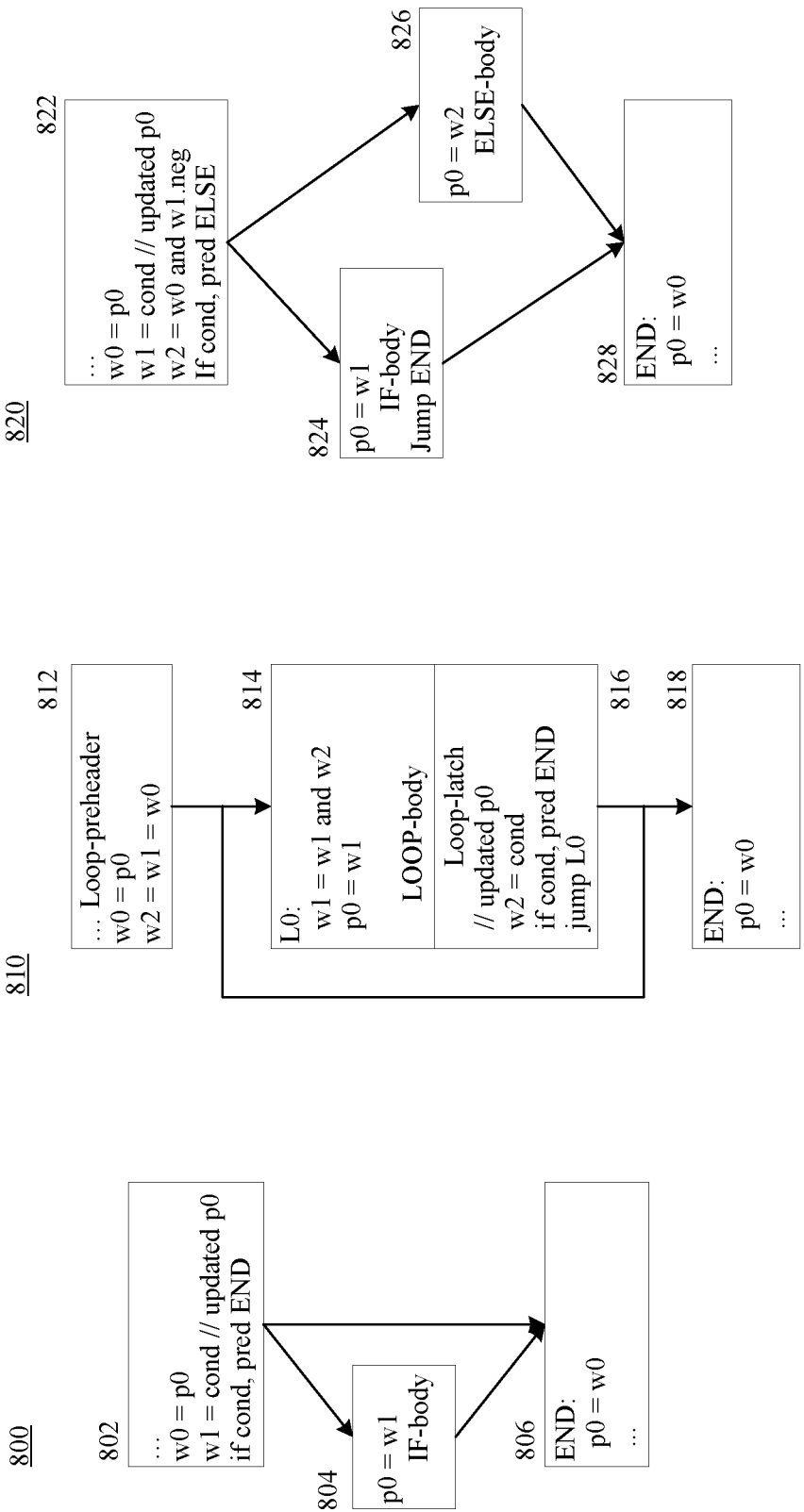
FIG. 8A illustrates an example instruction of an if-pattern control flow structure, according to an aspect.
FIG. 8B illustrates an example instruction of a loop-pattern control flow structure, according to an aspect.
FIG. 8C illustrates an example instruction of an if-else pattern control flow structure, according to an aspect.

FIG. 8A illustrates an example instruction of an if-pattern control flow structure, according to an aspect. The if-pattern example instruction 800 may correspond to the if-pattern control flow structure 500 of FIG. 5. The if-pattern example instruction 800 may refer to instructions, e.g., one if-statement, that a compiler may generate.

In aspect, the if-pattern example instruction 800 may comprise one or more of: a divergent block 802, an if-body block 804 and an end-block or convergent block 806. In an aspect, at block 802, instruction 'w0=p0' may indicate to save all lane masks (i.e., save all active threads). Further, at block 802, a set of conditions may be stored in a second warp register. In an aspect, p0 may control what threads are active, and based on p0, the active threads may be set to or compared with the conditions. For one or more active threads in which the conditions are true, the if-body block 804 may ensue. For one or more active threads in which the conditions are untrue, the end-block 806 may ensue. At the end-block 806, the predicated masks may be restored so that all threads active prior to the if-pattern control flow structure 800 are then reactivated after processing the if-pattern control flow structure.

In some aspects, an if-pattern control flow structure, e.g., the if-pattern example instruction 800, may need two warp registers for predication. In some aspects, the number of warp register needed for predicating a control flow structure may be based on the level divergency (the number of nested blocks) the control flow structure may have. The more nested a control flow structure, a more warp register may be needed for predicating the control flow structure.

FIG. 8B illustrates an example instruction of a loop-pattern control flow structure, according to an aspect. The loop-pattern example instruction 810 may correspond to the loop-pattern control flow structure 600 of FIG. 6. In an aspect, the loop-pattern example instruction 810 may comprise one or more of: a loop preheader or loop-head 812, loop body 814, loop-latch 816, and a landing or end block 818. In some aspect, based on a set of conditions set out in the loop-latch, the path may lead to the end block 818 or loop back to the loop-body 814 as illustrated. In an aspect, the loop-preheader block 812 may indicate to save all lane masks (active threads). In an aspect, the one or more active threads, based on conditions set out in the loop-latch 816, may undergo or perform operations according to loop-body 814 and loop-latch 816. At the end-block 818, the predicated masks may be restored. In some aspects, a loop-pattern control flow structure, e.g., the loop-pattern example instruction 810, may need three warp registers for predication.

FIG. 8C illustrates an example instruction of an if-else pattern control flow structure, according to an aspect. The if-else pattern example instruction 820 may correspond to the if-ese control flow structure 750 of FIG. 7A. In an aspect, the if-else-pattern example instruction 820 may comprise one or more of: a divergent block 822, an if-body block 824, an else-block 826 and an end block or convergent block 828. In an aspect, the divergent block 822 may indicate to save all lane masks (active threads) and store a set of conditions (in a warp register). For one or more active threads in which the conditions are true, the if-body block 824 may ensue. For one or more active threads the conditions are untrue, the else-body block 826 may ensue. The end block or convergent block 828 may converge the paths from the if-body block 824 and the else-body block 826. Further, at the end-bock 828, the predicated masks may be restored. In some aspects, an if-else-pattern control flow structure, e.g., the if-else-pattern example instruction 820, may need three warp registers for predication.

In some aspects, determining the innermost convergent region and one or more candidate regions may be based on the critical path of the program. In some aspects, critical path may refer to a path taken or crossing all divergent blocks and their corresponding convergent blocks that may lead to the highest divergent depth in the whole program.

According to an aspect, the innermost convergent block with the maximum divergent depth may be on the critical path. The innermost convergent block with the maximum divergent depth may be represented as bb. In some aspects, if a convergent block with a divergent depth of 0, which may be represented as bb', immediately post-dominates bb, on any path from bb' (included) to bb (included), the convergent blocks are on the critical path. The term 'included' used here in reference to bb' and bb indicates that the divergent depth of bb' and bb are included in the analysis for determining the critical path. Correspondingly, the divergent blocks converged by those convergent blocks on the critical path and with the same divergent depth may be on the critical path.

In an aspect, in reference to FIG. 1A, bb 103, being the innermost convergent block, may be on the critical path associated with the CFG 120. Further, bb 104 may refer to a convergent block with a divergent depth of 0, which may immediately post-dominate bb 103. Thus, bb 104 may also be on the critical path associated with the CFG 120. The critical path associated with the CFG 120 may further comprise divergent blocks (e.g., bb 101 being corresponding divergent block of convergent block 103, and bb 100 being corresponding divergent block of convergent block 104).

Accordingly, predication, applied to select regions, may be combined with branching to improve performance. To determine the regions of a program for predication may involve one or more operations. In an aspect, a branching solution may be applied, initially, to the control flow structures of the program. In some aspects, the maximum divergent depth of the program may be calculated to be the DPC level of the program. In an aspect, a compiler may determine one or more blocks or regions to predicate for reducing the DPC level. In some aspects, the innermost divergent block with if-pattern or if-else pattern may be given the highest priority for predication. In some aspects, a scalar register pressure analysis may be performed to determine one or more candidate regions to predicate. In some aspect, the scalar register pressure analysis may determine a maximum and a minimum number of divergent blocks to predicate. In some aspects, priority for predication may be based on the critical path. For example, a higher priority for predication may be given to a divergent block that is on the critical path, where divergent depth reaches the maximum.

As described herein, the predication applied to the innermost convergent region may be based on a free predication. In some aspects, one or more instructions including save_p0, neg_p0 and pop_p0 may be used for saving one level of p0 (predicate lane mask) onto a stack. In some aspects, these instructions may be faster than using scalar registers. Accordingly, in some aspects, one or more of save_p0, neg_p0, and pop_p0 may be used to predicate the innermost convergent region indicative of an if-pattern or if-else pattern control flow structure. Using such instructions for predicating the inner most convergent region may improve performance, since this approach does not require the usage of scalar registers.

In some aspects, the one or more candidate regions for applying predication based on scalar register(s) may refer to the non-innermost regions that are on the critical path. In some aspects, one or more candidate regions may include one or more of: an if-pattern control flow structure, an if-else-pattern control flow structure, and a loop-pattern control flow structure. In some aspects, the one or more candidate regions may be determined based on a scalar register limit such that as many candidate regions may be selected to perform predication before a scalar register limit is reached (i.e., to avoid scalar register spills).

Figure 9:
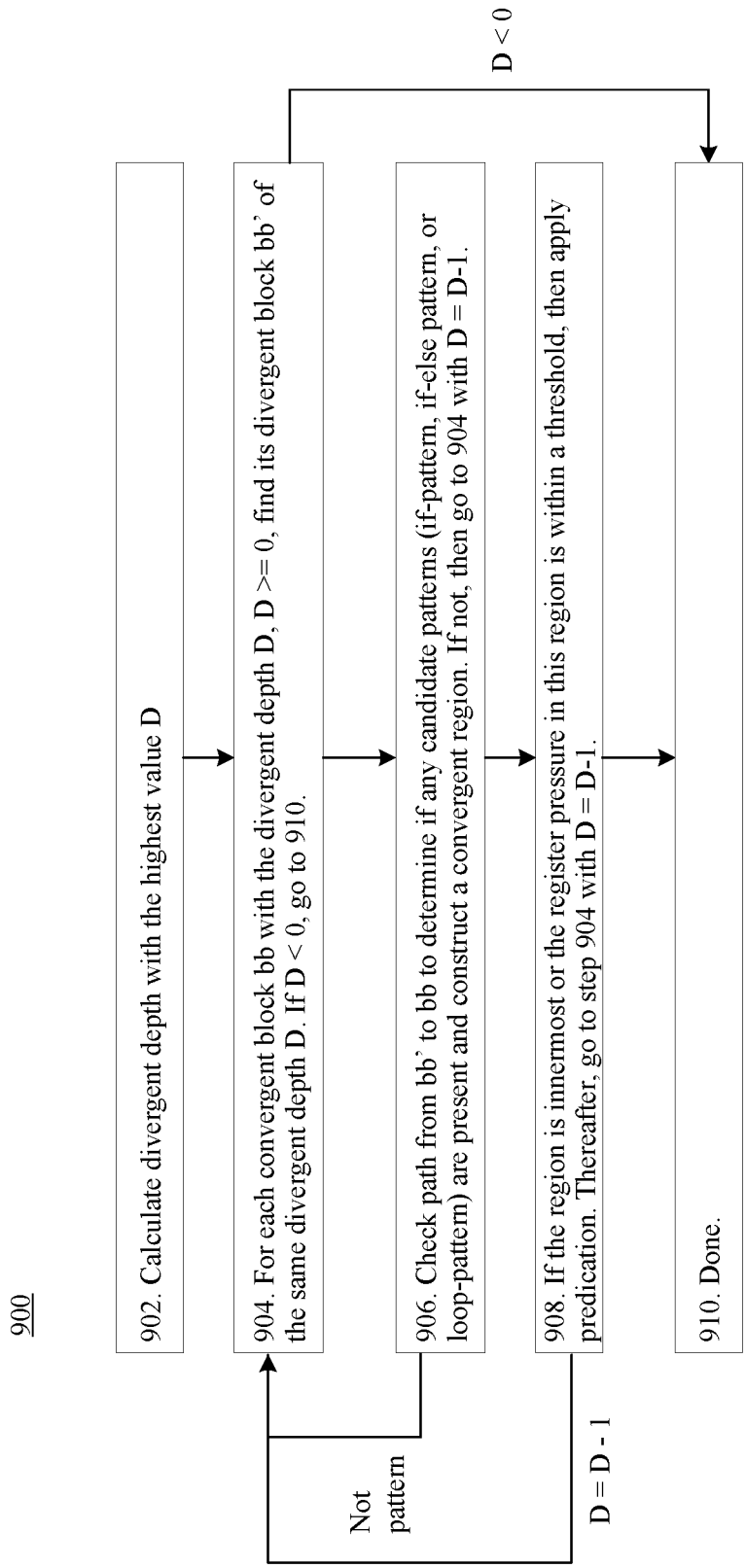
FIG. 9 illustrates a method for determining one or more regions for predication, according to an aspect.

FIG. 9 illustrates a method for determining one or more regions for predication, according to an aspect. In an aspect, the method 900 may include at 902 calculating the highest divergent depth, D, of a program. In some aspects, the method 900 may further include at 904, for each convergent block, bb, with the divergent depth D, where D>=0, determine a corresponding divergent block, bb', of the same divergent depth D. In some aspects, if the highest divergent depth is less than 0, then the method may be concluded, at 910.

In some aspects, where the determined highest divergent depth D is >=0, the method 900 may further include at 906, examining the path from the divergent block, bb', to the convergent block bb, to determine if any candidate regions are present and construct a convergent region. In some aspects, the candidate regions may include one or more of: an if-pattern control flow structure, an if-else pattern control flow structure, and a loop-pattern control flow structure. If no so such candidate pattern is determined, then the method may return to operations performed at 904 with D=D-1.

In some aspects, if a candidate region is determined at 906, the method may further include, at 908, applying predication if the candidate region is innermost or if the register pressure in this region is within a threshold. In some aspects, if the candidate region is innermost, the applied predication may be based on a free predication. IN some aspects, if the candidate region is non-innermost and the register pressure is within a threshold, the applied predication may use one or more warp registers. After applying predication, the method 900 may return to operations performed at 904 with D=D-1.

As described herein, in some aspects, the control flow blocks or structures on a critical path of a program may be analyzed for predication suitability. In some aspects, the predication suitability of the control flow blocks may be based on one or more patterns, e.g., if-pattern, if-else-pattern, and loop-pattern. In some aspects, the predication suitability may be further based on the register pressure, such that predication may be applied to a control flow block if the register pressure is within a threshold. Determining if the register pressure is within a threshold may involve estimating the register pressure based on applying predication on a control flow block, and if the estimated register pressure is found to be within the threshold, then predication may be applied to control flow block. In some aspects, the threshold may refer to a value or a reference above which the warp registers may spill. In some aspects, structured patterns may be determined based on methods and conditions set out herein for improved performance compare to a full branching or full predication solution.

Figure 10:
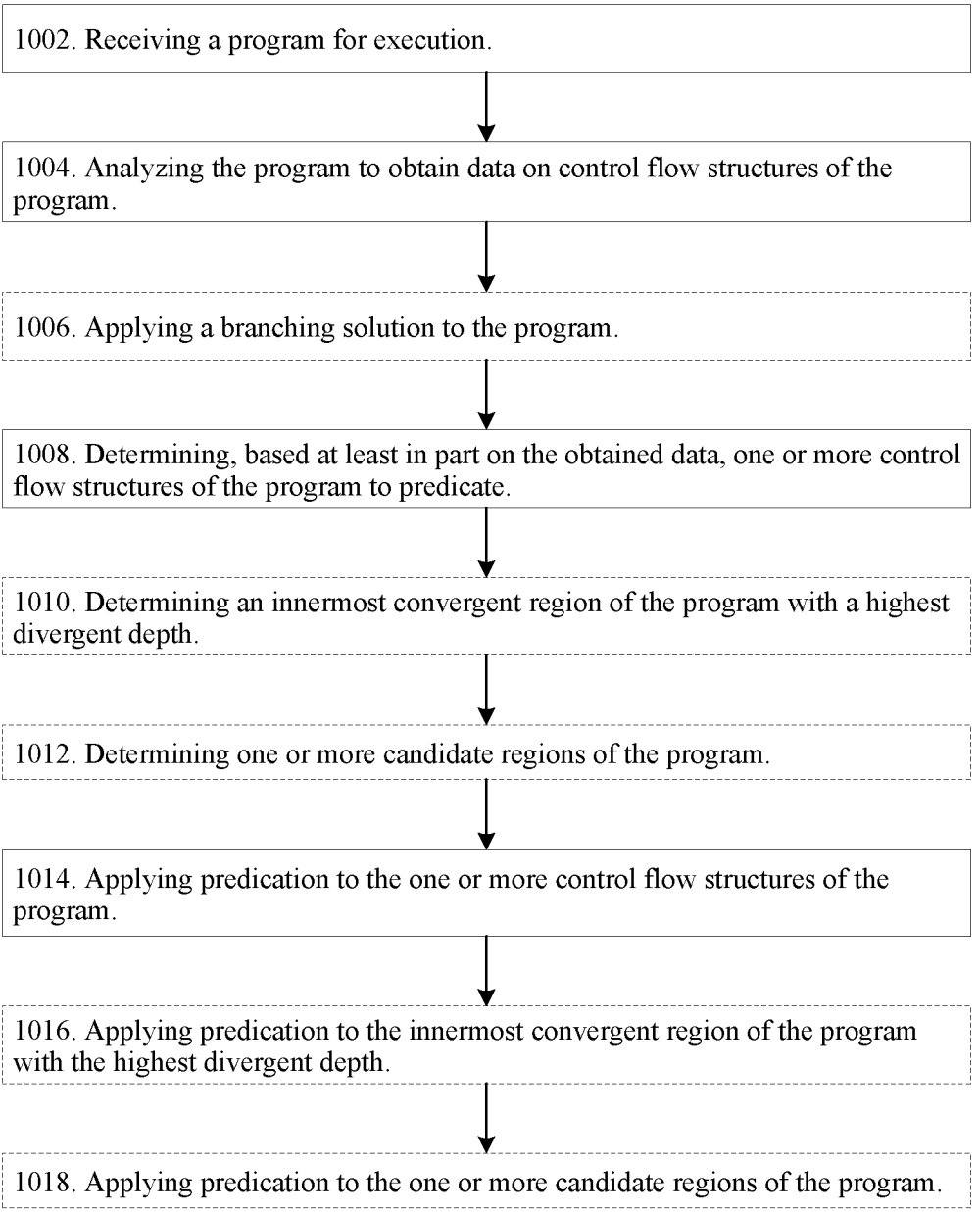
FIG. 10 illustrates a method, according to an aspect.

FIG. 10 illustrates a method, according to an aspect. In an aspect, method 1000 may be performed by a processing unit, such as a GPU. In an aspect, the method may include, at 1002, receiving a program for execution. The method may further include, at 1004, analyzing the program to obtain data on control flow structures of the program. The method may further include, at 1008, determining, based at least in part on the obtained data, one or more control flow structures of the program to predicate. The method may further include, at 1014, applying predication to the one or more control flow structures of the program.

In some aspects, analyzing the program to obtain data on control flow structures may include analyzing divergent depth of the one or more regions or control flow structures of the program. In some aspects, analyzing the program to obtain data on control flow structures may include determining one or more of: innermost convergent regions, convergent regions, and critical path. In some aspects, analyzing the program to obtain data on control flow structures of the program, may include, at 1006, applying a branching solution to the program. In some aspects, applying branching solution to the program includes adding branching instructions to all regions (control flow structures) of the program. In some aspects, determining, based at least in part on the obtained data, one or more control flow structures of the program to predicate may include, at 1010, determining an innermost convergent region of the program with a highest divergent depth. In some aspects, applying, predication to the one or more control flow structures of the program may include, at 1016, applying predication to the innermost convergent region of the program with the highest divergent depth.

In some aspects, applying predication to the innermost convergent region of the program with the highest divergent depth may include applying a free predication solution. In some aspects, determining the innermost convergent region of the program with the highest divergent depth may include determining one of: an if-pattern control flow structure and an if-else-pattern control flow structure.

In some aspects, determining, based at least in part on the obtained data, one or more control flow structures of the program to predicate may further include, at 1012, determining one or more candidate regions of the program in a descending order of highest divergent depth. In some aspects, each subsequent candidate region determined may have a divergent depth equal to or less than a divergent depth of a previous candidate region determined. In some aspects, the first candidate region of the one or more candidate regions determined may have a divergent depth equal to or less than the divergent depth (the highest divergent depth) of the innermost convergent region. The second candidate region of the one or more candidate region determine may have a divergent depth equal to or less than the divergent depth of the first candidate region. The number of candidate region determined may be determined based on the threshold pressure.

In some aspects, applying predication to the one or more control flow structures of the program further may further include, at 1018, applying predication to each candidate region of the one or more candidate regions.

In some aspects, determining one or more candidate regions of the program in a descending order of highest divergent depth may further include determining, for each candidate region of the one or more candidate regions, that a scalar register pressure associated with the PU is below a threshold pressure of the PU if predication is applied to said each candidate region.

In some aspects, determining one or more candidate regions of the program in a descending order of highest divergent depth may include determining one or more of: an if-pattern control flow structure, an if-else-pattern control flow structure, and a loop-pattern control flow structure.

In some aspects, determining, based at least in part on the obtained data, one or more control flow structures of the program to predicate may include analyzing, a scalar register pressure associated with a PU to determine one or more candidate regions of the program to predicate based on a threshold pressure of the PU and the highest divergent depth.

In some aspects, analyzing the scalar register pressure to determine one or more candidate regions may include determining, for each candidate region of the one or more candidate regions, that the scalar register pressure is below the threshold pressure if predication is applied to said candidate region. In some aspects, analyzing the scalar register pressure to determine one or more candidate regions may include determining the one or more candidate regions in a descending order of highest divergent depth of the program.

In some aspects, analyzing the scalar register pressure to determine one or more candidate regions of the program may include determining one or more of: an if-pattern control flow structure, an if-else-pattern control flow structure, and a loop-pattern control flow structure.

In some aspects, applying predication to the one or more control flow structures of the program may include applying predication to the determined one or more candidate regions of the program.

In some aspects, applying predication to the one or more control flow structures of the program may include adding predication instructions to the regions associated with the one or more control flow structures. In some aspects, applying predication to the one or more control flow structures of the program may include replacing the branching instructions associated with the one or more control flow structures with predication instructions.

Accordingly, in some aspects, branching and predication may be applied to select regions of the same program. Branching may be applied to a first region of the program and predication may be applied to a second region of the program. In some aspects, the second region of the program may include one or more regions associated with one or more control flow structures determined to be beneficial for applying predication as described herein. In some aspects, the first region of the program may include all regions of the program other than the second region.

In some aspects, branching and predication may be applied to the same program to allow for improved performance of the program with control flow structures. In some aspects, the innermost convergent region which have if-pattern control flow structure or if-else pattern control flow structure may be predicated. In some aspects, such innermost convergent regions may be based on free predication. For example, an innermost if-pattern control flow structure or an innermost if-else pattern control flow structure may be free to predicate due to save_p0 and restore_p0 special registers. Using free predication may further improve performance of a program. In some aspects, register pressure associated with a candidate region may be estimated or calculated to ensure that predication on said candidate region will not cause a spill. In some aspects, the divergent depth of the control flow structures may be analyzed to determine the critical path of the program. The critical path of the program may be used to determine one or more candidate regions for predication, which further reduces the DPC level.

One or more aspects described herein may apply to any data-parallel architecture that supports SIMD mode (single instruction, multiple data). For example, one or more aspects described herein may apply to all next-gen GPU that allow for mixing of branching and predication solutions for the same program. Aspects described herein may further apply to data-parallel architectures, e.g., GPUs, that carry out, process or run divergent codes. Further, one or more aspects may apply to compiler design and implementation of such data-parallel architectures.

Figure 11:
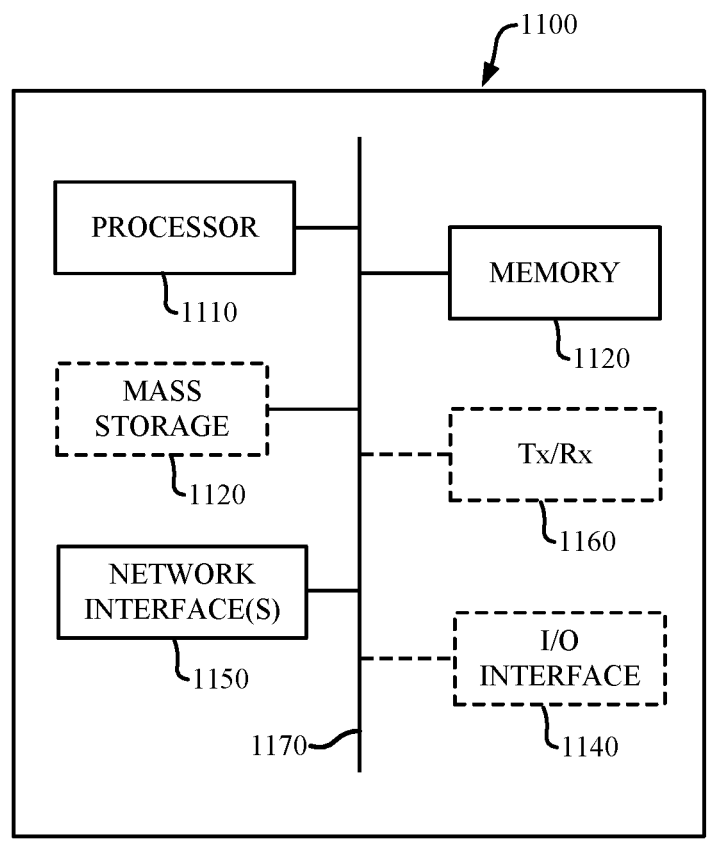
FIG. 11 is an apparatus that may perform any or all of operations of the above methods and features explicitly or implicitly described herein, according to an aspect.

FIG. 11 is an apparatus that may perform any or all of operations of the above methods and features explicitly or implicitly described herein, according to an aspect. In some aspects, the apparatus 1100 may refer to a data parallel architecture, a processing unit, a GPU, and the like as may be appreciated by a person skilled in the art. In some aspects, apparatus 1100 may be used to implement one or more aspects described herein.

As shown, the apparatus 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. According to certain aspects, any or all of the depicted elements may be utilized, or only a subset of the elements. Further, apparatus 1100 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain aspects, the memory 1120 or mass storage 1130 may have recorded thereon statements and instructions executable by the processor 1110 for performing any of the aforementioned method operations described above.

One or more aspects of the disclosure may be implemented using electronics hardware, software, or a combination thereof. Some aspects may be implemented by one or multiple computer processors executing program instructions stored in memory. Some aspects may be implemented partially or fully in hardware, for example using one or more field programmable gate arrays (FPGAs) or application specific integrated circuits (ASICs) to rapidly perform processing operations.

It will be appreciated that, although specific aspects of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions provided herein, some aspects may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods according to one or more aspects described herein. For example, such an execution may correspond to a simulation of the logical operations as described herein. The software product may additionally or alternatively include a number of instructions that enable a computer device to execute operations for configuring or programming a digital logic apparatus in accordance with one or more aspects described herein.

Although some aspects have been described with reference to specific features and embodiments, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   receiving, by a processing unit (PU), a program for execution;
   applying, by the PU, a branching solution to the program to obtain data on control flow structures of the program;
   determining, by the PU and based at least in part on the obtained data, one or more control flow structures of the program to predicate, wherein the determining comprises determining an innermost convergent region of the program with a highest divergent depth; and
   applying, by the PU, predication to the one or more control flow structures of the program, wherein the applying includes applying a free predication solution to the innermost convergent region of the program with the highest divergent depth.

2. The method of claim 1, wherein determining, by the PU, the innermost convergent region of the program with the highest divergent depth comprises determining one of: an if-pattern control flow structure and an if-else-pattern control flow structure.

3. The method of claim 1, wherein determining, by the PU and based at least in part on the obtained data, one or more control flow structures of the program to predicate further comprises:
   determining, by the PU, one or more candidate regions of the program in a descending order of highest divergent depth.

4. The method of claim 3, wherein applying, by the PU, predication to the one or more control flow structures of the program further comprises:
   applying, by the PU, the predication to each candidate region of the one or more candidate regions.

5. The method of claim 3, wherein determining, by the PU, one or more candidate regions of the program in a descending order of highest divergent depth comprises determining one or more of:
   an if-pattern control flow structure;
   an if-else-pattern control flow structure; and
   a loop-pattern control flow structure.

6. A method comprising:
   receiving, by a processing unit (PU), a program for execution;
   applying, by the PU, a branching solution to the program to obtain data on control flow structures of the program;
   determining, by the PU and based at least in part on the obtained data, one or more control flow structures of the program to predicate; and
   applying, by the PU, predication to the one or more control flow structures of the program, wherein the determining one or more control flow structures of the program to predicate comprises:
      determining, by the PU, one or more candidate regions of the program in a descending order of highest divergent depth, including determining, for each candidate region of the one or more candidate regions, that a scalar register pressure associated with the PU is below a threshold pressure of the PU if the predication is applied to said each candidate region.

7. A method comprising:
   receiving, by a processing unit (PU), a program for execution;
   applying, by the PU, a branching solution to the program to obtain data on control flow structures of the program;
   determining, by the PU and based at least in part on the obtained data, one or more control flow structures of the program to predicate; and
   applying, by the PU, predication to the one or more control flow structures of the program, wherein the determining one or more control flow structures of the program to predicate comprises:

determining, by the PU, an innermost convergent region of the program with a highest divergent depth; and analyzing, by the PU, a scalar register pressure associated with the PU to determine one or more candidate regions of the program to predicate based on a threshold pressure of the PU and the highest divergent depth.

8. The method of claim 7, wherein applying, by the PU, predication to the one or more control flow structures of the program comprises:

applying, by the PU, the predication to the determined one or more candidate regions of the program.

9. The method of claim 7, wherein analyzing the scalar register pressure to determine one or more candidate regions comprises:

determining, for each candidate region of the one or more candidate regions, that the scalar register pressure is below the threshold pressure if the predication is applied to said candidate region.

10. The method of claim 7, wherein analyzing the scalar register pressure to determine one or more candidate regions comprises:

determining, by the PU, the one or more candidate regions in a descending order of highest divergent depth of the program.

11. The method of claim 7, wherein analyzing the scalar register pressure to determine one or more candidate regions of the program comprises determining one or more of:

an if-pattern control flow structure;
an if-else-pattern control flow structure; and
a loop-pattern control flow structure.

* * * * *